United States Patent [19]

Declouette

[11] Patent Number: 5,116,068
[45] Date of Patent: May 26, 1992

[54] TREE TRANSPORT

[76] Inventor: Frederick J. Declouette, 18540 Markham St., Perris, Calif. 92370

[21] Appl. No.: 306,046

[22] Filed: Feb. 6, 1989

[51] Int. Cl.$^5$ ............................................. B62B 1/14
[52] U.S. Cl. ................................. 280/47.24; 280/79.6
[58] Field of Search ............ 280/47.131, 47.16, 47.17, 280/47.24, 47.26, 47.34, 63, 79.11, 79.3, 79.5, 79.6; 414/23

[56] References Cited

U.S. PATENT DOCUMENTS

| | | | |
|---|---|---|---|
| 713,501 | 11/1902 | Ryder | 414/23 |
| 765,586 | 7/1904 | Mason | 414/23 |
| 1,174,950 | 3/1916 | Sedgwick | 414/23 |
| 2,614,705 | 10/1952 | Coplen | 214/3 |
| 2,650,063 | 8/1953 | Hawkins | 254/132 |
| 3,112,037 | 10/1963 | Thiermann | 216/3 |
| 3,208,614 | 9/1965 | Armitago et al. | 280/47.24 |
| 4,362,451 | 12/1982 | Thiermann, Sr. | 414/23 |

Primary Examiner—Andres Kashnikow
Assistant Examiner—Richard Camby
Attorney, Agent, or Firm—Harvey S. Hertz

[57] ABSTRACT

A tree transport includes a main base having a handle at one end thereof and a tree base spacer at the other end thereof. A carriage having an axis extending generally parallel to the axis of the main base is used to support a tree during transport thereof. At least one axle has wheels thereof for supporting the tree transport with respect to the ground. Support rods are used to interconnect the axle and the main base.

1 Claim, 1 Drawing Sheet

TREE TRANSPORT

BACKGROUND OF THE INVENTION

1. Field of the Invention

The field of art to which the invention pertains includes a field of tree transports, and more particularly, with respect to a tree transport for positioning adjacent a tree and transporting the tree once it is cut down.

2. Background of the Invention

Numerous devices for transporting trees and poles are known. These include U.S. Pat. Nos. 4,362,451; 765,586; 3,112,037; 713,501; 2,650,063; 1,174,950; and 2,614,705. These patents utilize numerous devices for loading and transporting logs, but do not include a device which can be utilized to position the device when cutting a tree and then loading the tree onto a transport device and transporting the tree to a desired location. Such a device could be used when cutting Christmas trees, for example.

SUMMARY OF THE INVENTION

A tree transport comprises a main base having a handle at one end thereof and a tree base spacer at the other end thereof. A carriage has an axis extending generally parallel to the axis of the main base for supporting a tree during transport. At least one axle contains wheels secured thereto for supporting the tree transport with respect to the ground. Support rods are used to interconnect the axle and the main base.

The advantages of this invention, both as to its construction and mode of operation, will be readily appreciated as the same becomes better understood by reference to the following detailed description, when considered in connection with the accompanying drawings, in which like referenced numerals designate like parts throughout the figures.

DESCRIPTION OF THE PREFERRED EMBODIMENTS

Figure 1:
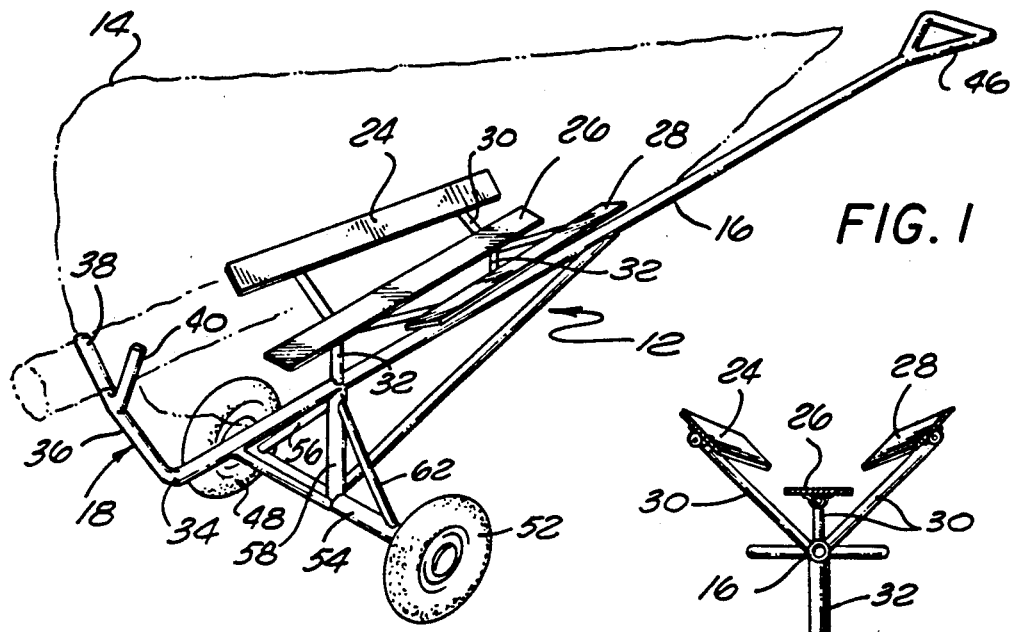
FIG. 1 is a perspective view illustrating the tree transport.
Figures 2A, 2B:
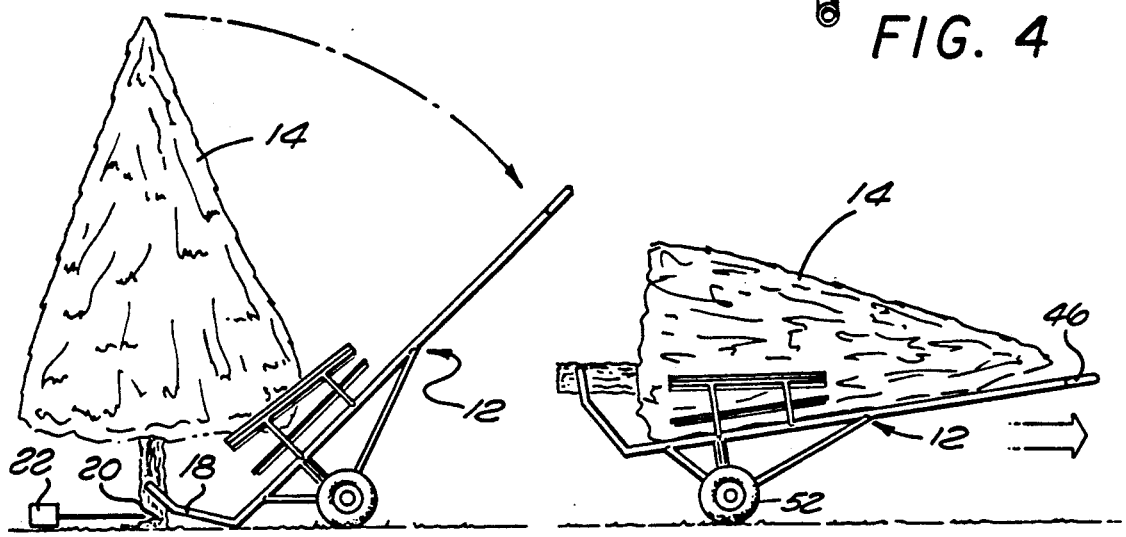
FIGS. 2(A) and 2(B) are perspective views of the tree transport of FIG. 1 illustrating its use during cutting of a tree and transporting the tree, respectively.
Figure 3:
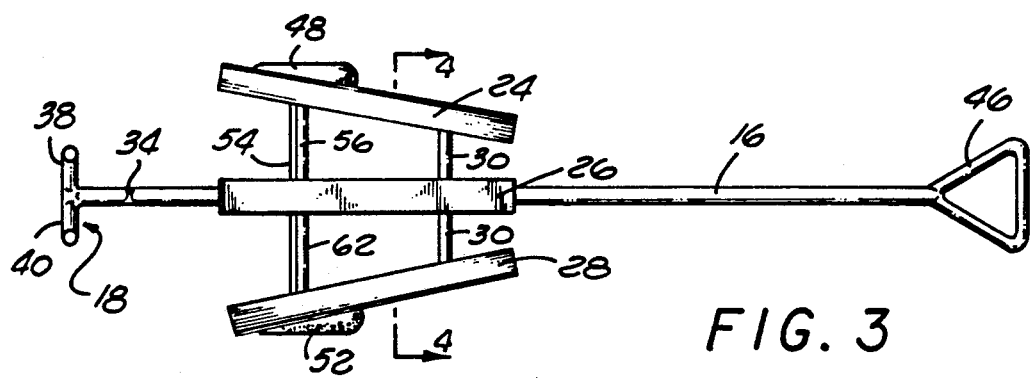
FIG. 3 is a top plan view of the tree transport.

Referring now to the drawings, there is shown in FIG. 1 and FIG. 2(A), a tree transport 12 constructed in accordance with the principles of the invention. The tree transport 12 is placed against a tree 14 to be cut down and removed by the tree transport. Initially, a main base 16 of the tree transport is placed at approximately a 45 degree angle with respect to the trunk of the tree 14 with a tree base spacer 18 formed at the lower end of the main base 16 being adjacent the tree trunk and slightly above a point 20 on the tree trunk where the tree trunk is to be cut by a saw 22. Once the tree is cut and positioned upon falling on the tree transport 12, the tree transport can be utilized to move the tree, as illustrated in FIG. 2(B) to a location where it is off-loaded.

Figure 4:
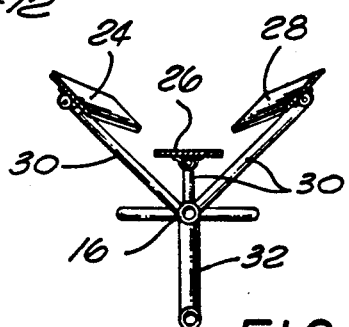
FIG. 4 is a cross-sectional view taken along the line 4—4 of FIG. 3.

The tree 14 is supported on the tree transport 12 by a plurality of carriage supports 24, 26 and 28 formed with a plurality of generally elongated members whose axes are generally parallel to the axis of the main base 16. In the embodiment as shown, the carriage supports 24, 26 and 28 define a generally U or V-shaped cross-sectional surface (FIG. 4) which is used to support the tree. It should be understood that more carriage supports could be used, or the carriage support can be formed of a continuous generally U-shaped surface.

The carriage side supports 24 and 28 are connected to the main base 16 by a plurality of carriage support rods 30 which the interconnect bottom surface of the carriage supports 24 and 28 to main base 16 via vertical support rods 32. It should be noted that although the central carriage support 26 is spaced from the main base 16 by the carriage support rods 30 and the vertical support rods 32, the carriage support 26 could actually be lowered and abut the surface of the main base 16.

The lower end 34 of the main base 16 has the Y-shaped tree base spacer 18 connected thereto. The Y-shaped tree base spacer 18 has its lower leg 36 connected to the lower end 34, while the arms 38 and 42 of the tree base spacer 18 extend outwardly and away from the main base 16.

The other end of the main base 16 contains a handle 46 which is used to push or pull the tree transport When the tree is in the transporting position as illustrated in FIG. 2(B), and the main base is in generally horizontal position as compared to the loading position of FIG. 2(A), the tree transport 12 is supported by a pair of wheels 48 and 52 which are interconnected by an axle 54. The axle 54 in turn is connected by a plurality of base support rods 56, 58 and 62 to the base 16.

In operation, the tree transport 12 is placed against the tree 14, as illustrated in FIG. 2(A) with the arms 38 and 42 of the Y-shaped tree base spacer 18 abutting the tree trunk at a position directly above the point 20 where the tree 14 is to be cut. Once the tree is cut, the tree will fall so that it is supported by the carriage supports 24, 26 and 28. Then the tree transport 12 is pivoted as shown in FIG. 2(B) to a position where the handle can be used to push or pull the tree transport and move the tree 14 to a desired location for off-loading.

I claim:

1. A tree transport comprising:

a main base having a handle at one end thereof and a tree base spacer at the other end thereof;

a carriage having an axis extending generally parallel to the axis of the main base for supporting a tree during transport thereof, said carriage including a plurality of adjacent carriage supports, each of said supports being formed along a fixed axis generally parallel to the axis of said main base;

at least one axle means having wheels secured thereto for supporting said tree transport with respect to the ground;

support rods interconnecting said axle means and said main base;

and wherein said tree base spacer is generally of Y-shaped configuration wherein the leg of said Y is connected to one end of said main base and said arms of said Y are free to be placed about the trunk of the tree, said tree based spacer being formed in a fixed plane generally perpendicular to the axis of said main base.

* * * * *